July 7, 1953 A. S. KLINICKI 2,644,268
FISHHOOK EXTRACTOR
Filed Aug. 13, 1952
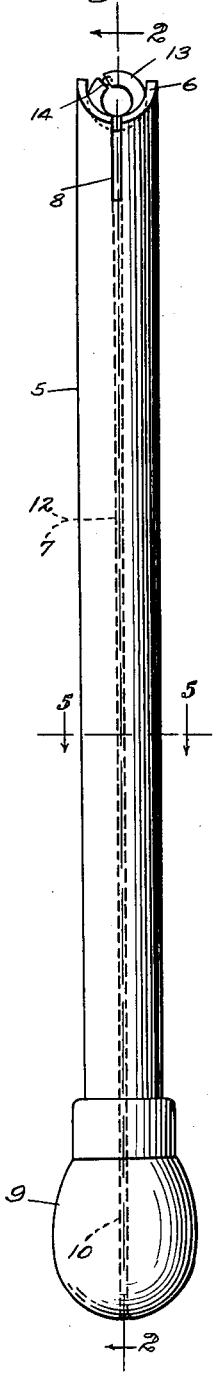
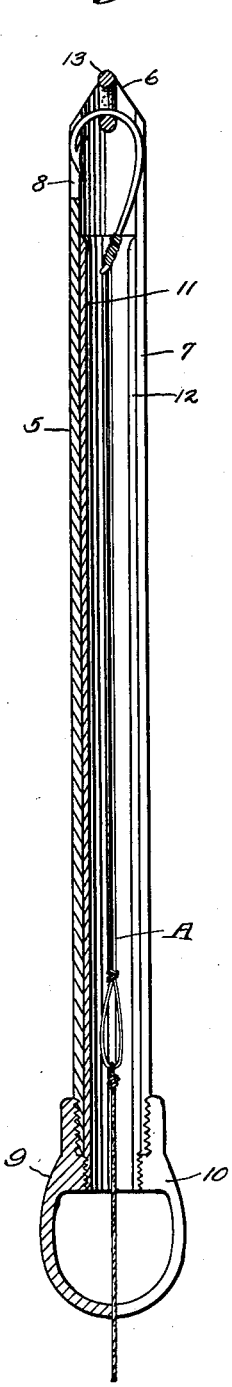
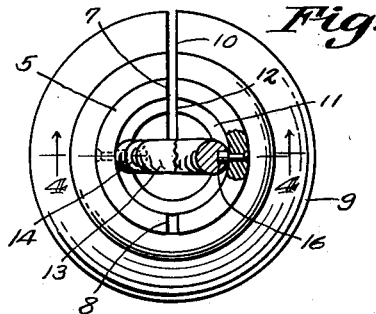
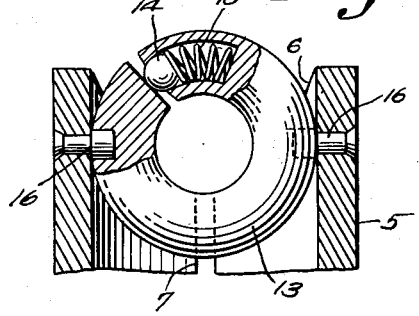
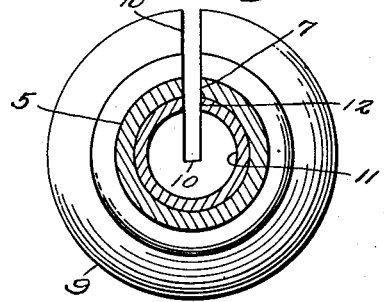
Anthony S. Klinicki
INVENTOR
BY CA Snow & Co.
ATTORNEYS.

Patented July 7, 1953

2,644,268

UNITED STATES PATENT OFFICE 2,644,268

FISHHOOK EXTRACTOR

Anthony S. Klinicki, Detroit, Mich.

Application August 13, 1952, Serial No. 304,199

3 Claims. (Cl. 43—53.5)

This invention relates to a device for extracting hooks from fish when they have been caught on a line, eliminating the necessity of the fisherman manipulating the hook by hand to remove the same, which sometimes results in damage to the fish and injury to the hands of the fisherman.

An important object of the invention is to provide a hook extracting device which may be readily and easily operated to remove a fish hook from the mouth or flesh of a fish, without tearing the meat of the fish, or causing severe injury to the fish.

A further object of the invention is to provide a fish extracting device which will provide means whereby the fish hook will be moved into one end of the device permitting of the ready removal of the hook and at the same time guarding the hook to prevent the hook from injuring the hands of the person using the hook extracting device.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is an elevational view of a fish hook extracting device, constructed in accordance with the invention.

Fig. 2 is a longitudinal sectional view through the extractor taken on line 2—2 of Fig. 1.

Fig. 3 is an enlarged end elevational view of the fish hook extractor, a portion thereof being broken away illustrating the pivot for the split ring at one end of the fish hook extractor.

Fig. 4 is a fragmentary sectional view taken on line 4—4 of Fig. 3.

Fig. 5 is an enlarged sectional view taken on line 5—5 of Fig. 1.

Referring to the drawing in detail, the fish hook extracting device comprises the tubular body 5 formed with the tapered end 6, the wall of the tubular body being formed with the wide slot 7 extending longitudinally thereof throughout its length. Directly opposite to the slot 7 is the substantially short slot 8 extending inwardly from the tapered end of the tubular body 5.

Secured on one end of the tubular body 5 is the knob 9 which is also formed with the slot 10 that forms a continuation of the slot 7 of the tubular body 5.

The reference character 11 indicates the inner tubular member which is formed with a longitudinally disposed slot 12 extending throughout the length thereof, the inner tubular member 11 having a threaded end fitted in a threaded bore formed in the knob 9, the knob providing means for rotating said inner tubular member 11 within the tubular body 5. This slot 12 also aligns with the slot 10 in the knob 9 as well as the slot 7 of the tubular body, so that when the slots 7, 10 and 12 are in alignment, a fishing line on which a fish hook to be extracted is secured, may be threaded through said registering slots and the inner tubular member 11 rotated to close the slot 7 and secure the fishing line, which in the present showing is indicated at A, against displacement through said slot.

Pivotally mounted within the tapered end 6 of the tubular body, is the split ring 13, one end of the split ring being formed with an opening in which the ball 14 is mounted, the ball 14 being biased towards the opposite end of the split ring by means of the spring 15. The ball 14, while it closes the space at the ends of the split ring, is capable of moving into the opening against the bias of the spring 15 when the fishing line and hook are pulled through the space between the ends of the split ring. It is obvious that as the fishing line and hook move past the ball 14, the ball will close the space between the ends of the split ring and hold the hook against displacement, to the end that the pointed end of the hook will rest in the substantially short slot 8 where it may be guarded against injuring the hand of the person using the device. As clearly shown by Fig. 4 of the drawing, the split ring is provided with openings in which the pintles 16 extend, the pintles 16 being secured in the wall of the tubular body 5, at points directly opposite to each other.

It will also be noted that the pintles are so arranged that the space between the ends of the split ring is disposed laterally of a line drawn longitudinally through the wide slot 7 so that when the ring is turned under the action of a hook, the space between the ends of the split ring, will not fall in alignment with the slot 7, thereby holding the hook against displacement.

In the use of the device for extracting fish hooks from fish, the fishing line is passed within the split ring and aligning slots of the tubular body 5 and inner tubular member 11.

After the hook has been extracted the hook will assume the position as shown by Fig. 2 of the drawing, where the prongs or piercing end of the hook will be guarded.

Having thus described the invention, what is claimed is:

1. A device for extracting fish hooks from fish, comprising a tubular body having a tapered end, a split ring pivotally mounted within the tapered end of said tubular body, an inner tubular member rotatable in said tubular body, said tubular body and inner tubular member having longitudinally disposed alignable slots in the wall thereof through which a fishing line is threaded, the fishing line having a hook to be extracted from a fish, the line being also passed within said split ring, the tapered end of said tubular body being adapted to be thrust against the fish adjacent to the fish hook being extracted, holding the fish while said fishing line is pulled through the tubular body, and said hook being adapted to pass into the split ring guarding said hook when removed from the fish.

2. A device for extracting fish hooks from fish, comprising a tubular body having a tapered end adapted to be held in engagement with the fish adjacent to the hook being extracted, a split ring pivotally mounted within the pointed end of the tubular body, an inner tubular member mounted for rotation within the tubular body, said tubular body and inner tubular member having longitudinal slots in the wall thereof through which a fishing line carrying a hook to be extracted is passed into the interior of the tubular body, whereby the fishing line when pulled through the tubular body will extract the fish hook from the fish, moving the hook into said split ring and holding the hook in a guarded position within one end of the tubular body.

3. A device for extracting fish hooks from fish, comprising a tubular body having a tapered end adapted to be held in engagement with the fish adjacent to the hook being extracted, a fish hook guard member pivotally mounted within the tapered end of the tubular body, and an inner tubular member mounted for rotation within the tubular body, said tubular body and inner tubular member having longitudinal slots in the wall thereof through which a fishing line carrying a hook to be extracted is passed into the interior of the tubular body, whereby the fishing line when pulled through the tubular body will extract the fish hook from the fish, moving the hook against said fish hook guard member and holding the hook in a guarded position within one end of the tubular body.

ANTHONY S. KLINICKI.

References Cited in the file of this patent

UNITED STATES PATENTS

| Number | Name | Date |
|---|---|---|
| 253,363 | Foard | Feb. 7, 1882 |
| 1,728,864 | Kramer | Sept. 17, 1929 |
| 2,441,458 | Underwood | May 11, 1948 |
| 2,455,013 | Klinicki | Nov. 30, 1948 |